United States Patent

[11] 3,542,427

| [72] | Inventors | Donald R. Herpel<br>Southfield;<br>Vincent Rotole, Detroit, Michigan |
|------|-----------|---------------------------------------------------------------------|
| [21] | Appl. No. | 763,482 |
| [22] | Filed | Sept. 12, 1968 |
| [45] | Patented | Nov. 24, 1970 |
| [73] | Assignee | Ford Motor Company<br>Dearborn, Michigan<br>a corporation of Delaware |

[54] VEHICLE SEAT ASSEMBLY WITH MOVABLE ARMRESTS
1 Claim, 4 Drawing Figs.

[52] U.S. Cl. .................... 297/417, 297/422
[51] Int. Cl. .................... A47c 7/54
[50] Field of Search ........... 297/417, 422, 423, 414, 191

[56] References Cited
UNITED STATES PATENTS

| 2,767,778 | 10/1956 | Kriger et al. | 297/417X |
| 3,116,093 | 12/1963 | Bosack | 297/417 |
| 3,168,346 | 2/1965 | Rei | 297/417X |
| 3,172,699 | 3/1965 | Naughton | 297/417X |
| 3,357,740 | 12/1967 | Vaughn et al. | 297/417X |

Primary Examiner—David J. Williamowsky
Assistant Examiner—Wayne L. Shedd
Attorney—John R. Faulkner and E. Dennis O'Connor ABSTRACT: A seat assembly for a vehicle passenger compartment including a pair of spaced-apart armrests secured to the upright seat back structure. The armrests are movable from substantially horizontal positions to substantially vertical positions and are interconnected by a yieldable friction coupling. This coupling allows movement of the armrests either in unison or individually.

Patented Nov. 24, 1970

INVENTORS
Donald R. Herpel
Vincent Rotole
BY John R. Faulkner
E. Dennis O'Conner
ATTORNEYS.

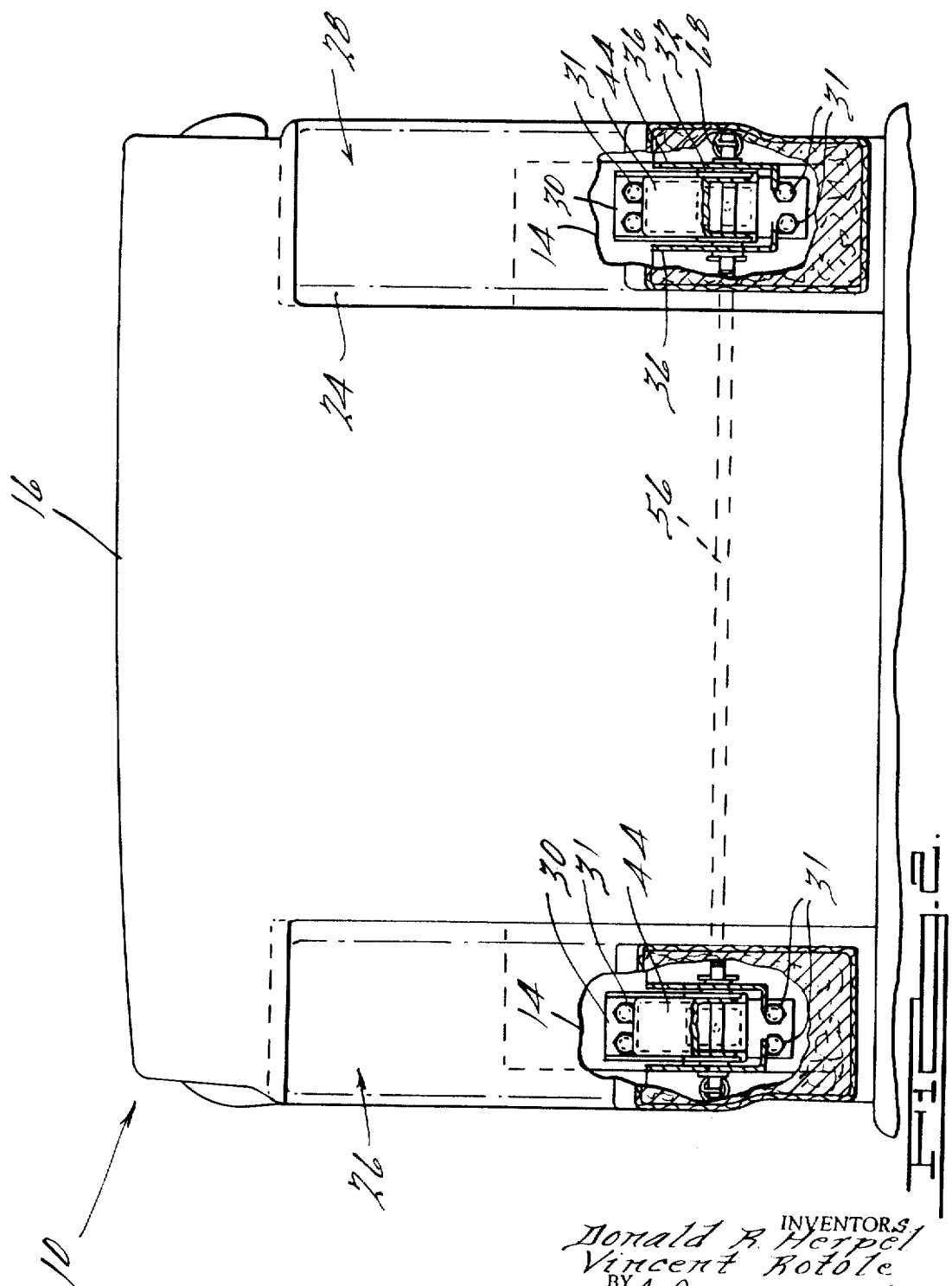

VEHICLE SEAT ASSEMBLY WITH MOVABLE ARMRESTS

BACKGROUND OF THE INVENTION

Because of considerations relating to passenger comfort, armrests long have been included in motor vehicle interior designs. Historically, armrests pivotally secured to seat assemblies near the midpoint of bench-type seats and at the inboard extremities of split bench and bucket-type seats, increasingly have gained in acceptance and incidence of utilization. Recently, passenger compartment interior design schemes have provided for the elimination of projections from the interior door panels. Armrests secured to these door panels thus have been eliminated in many instances.

In order to promote passenger comfort, it has been proposed that pivotally movable armrests be provided proximate the outboard extremes of vehicle seat assemblies, as well as near the vehicle centerline, to compensate for the removal of door panel mounted armrests. Such an outboard armrest must be moved from its horizontal position on the seat cushion when access and egress of a passenger is desired. This frequent and necessary movement of outboard armrests, as well as the conventional optional movement of inboard armrests, may occasion an objectionable plurality of manual tasks for a vehicle passenger and decrease the desirability and incidence of armrest installations to the detriment of passenger comfort.

It is an object of this invention to provide a motor vehicle passenger seat assembly having a movable armrest at locations both outboard and inboard of the position of a seated passenger. In order to simplify and reduce the manual tasks required of a passenger in positioning these armrests between useful and stowed positions, these armrests may be moved simultaneously by physically moving only one of the armrests, or individually, by moving one of the armrests while holding the other against movement.

SUMMARY OF THE INVENTION

A motor vehicle seat assembly constructed in accordance with this invention includes a substantially horizontal seat cushion structure and an upright seat back structure secured to the seat cushion structure. A pair of spaced-apart armrests are pivotally secured to one of these structures and are movable between substantially horizontal positions and upright positions. Rotating means are secured to the seat back structure. Each of the armrests has surface means formed thereon that are in continual, yieldable frictional contact with the rotating means in all armrests positions. Thus the armrests may be moved between the horizontal and vertical positions either individually or in unison.

DESCRIPTION OF THE DRAWINGS

FIG. 2 is a sectional view taken along the line 2—2 of FIG. 1;

DETAILED DESCRIPTION OF THE INVENTION

Figure 1:
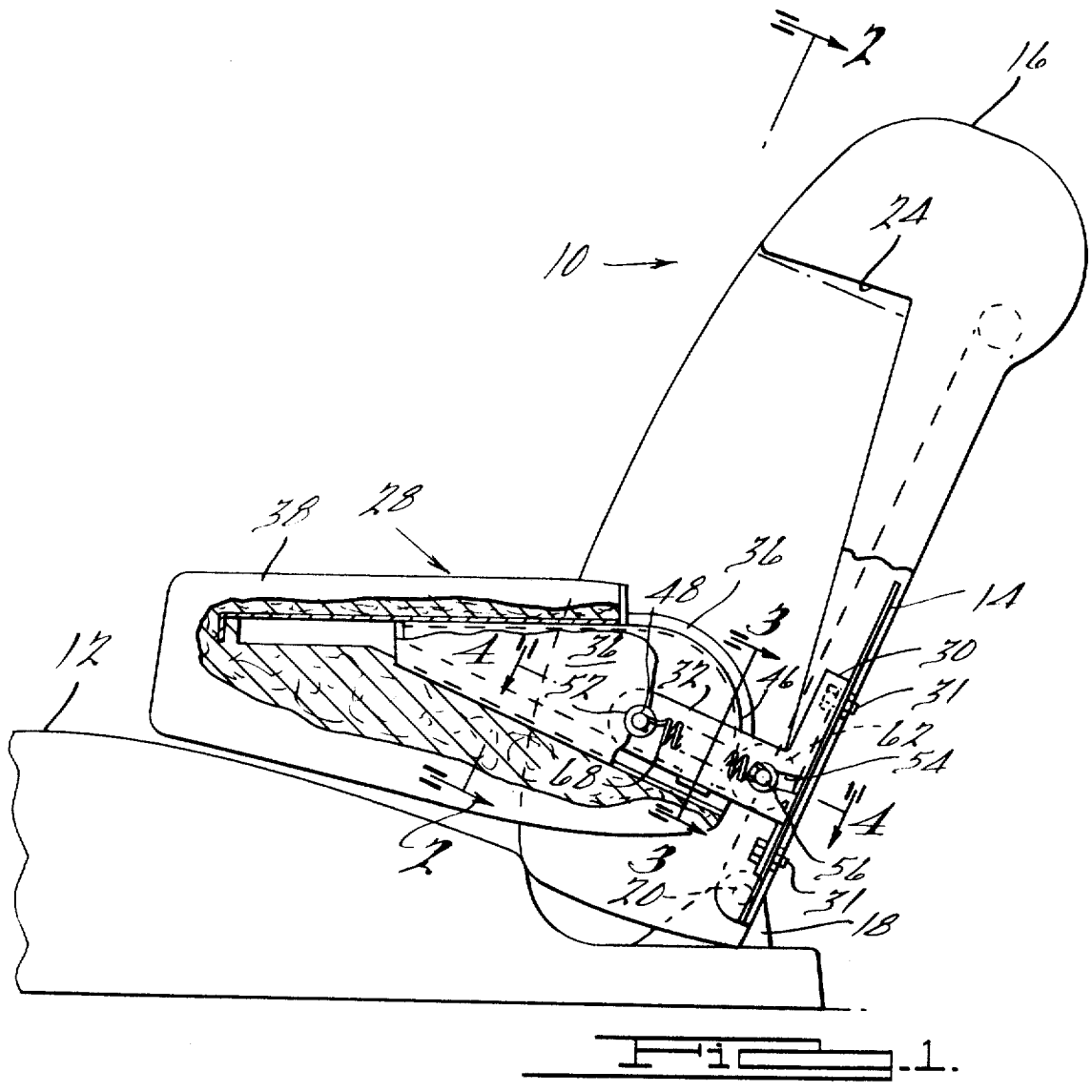
FIG. 1 is a side elevation view, with parts cut away, of the motor vehicle seat assembly of this invention.

Referring now in detail to the drawings and in particular to FIGS. 1 and 2 thereof, the numeral 10 denotes generally a motor vehicle seat assembly constructed in accordance with this invention. This seat assembly includes a substantially horizontally extending seat cushion structure 12 and a seat back having a frame 14 and cushion 16. Seat back frame 14 is secured to an upwardly extending tab 18 that is secured to seat cushion structure 12 by a fastener 20. Fastener 20 may be a pivot pin in the case of a seat assembly to be used in a two door vehicle in order that seat back 14 may be pivotally secured to the horizontal seat cushion structure 12. Seat back cushion 16 has formed at both of its lateral extremities recesses 22 and 24. These recesses are adapted to receive armrests 26 and 28, respectively, that are pivotally mounted to the seat back frame 14 as will be described in detail below. The mounting and construction of armrests 26 and 28 is identical so that only a detailed description of these aspects of armrest 28 will be included below.

Figure 3:
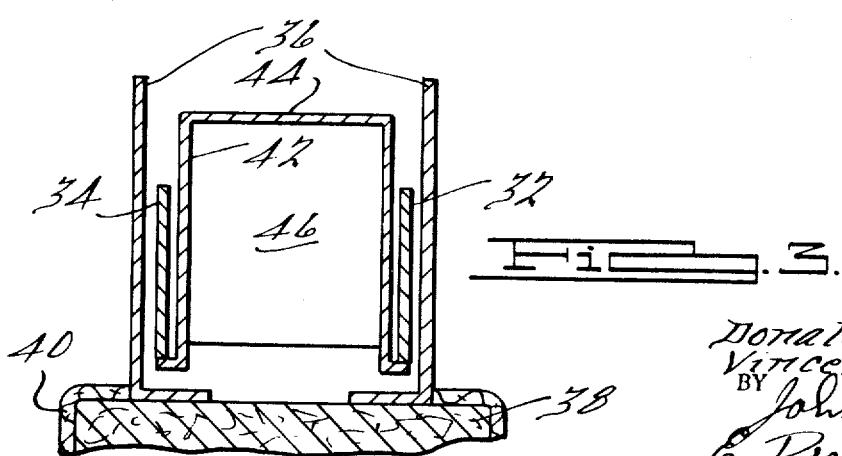
FIG. 3 is a sectional view taken along the line 3—3 of FIG. 1.
Figure 4:
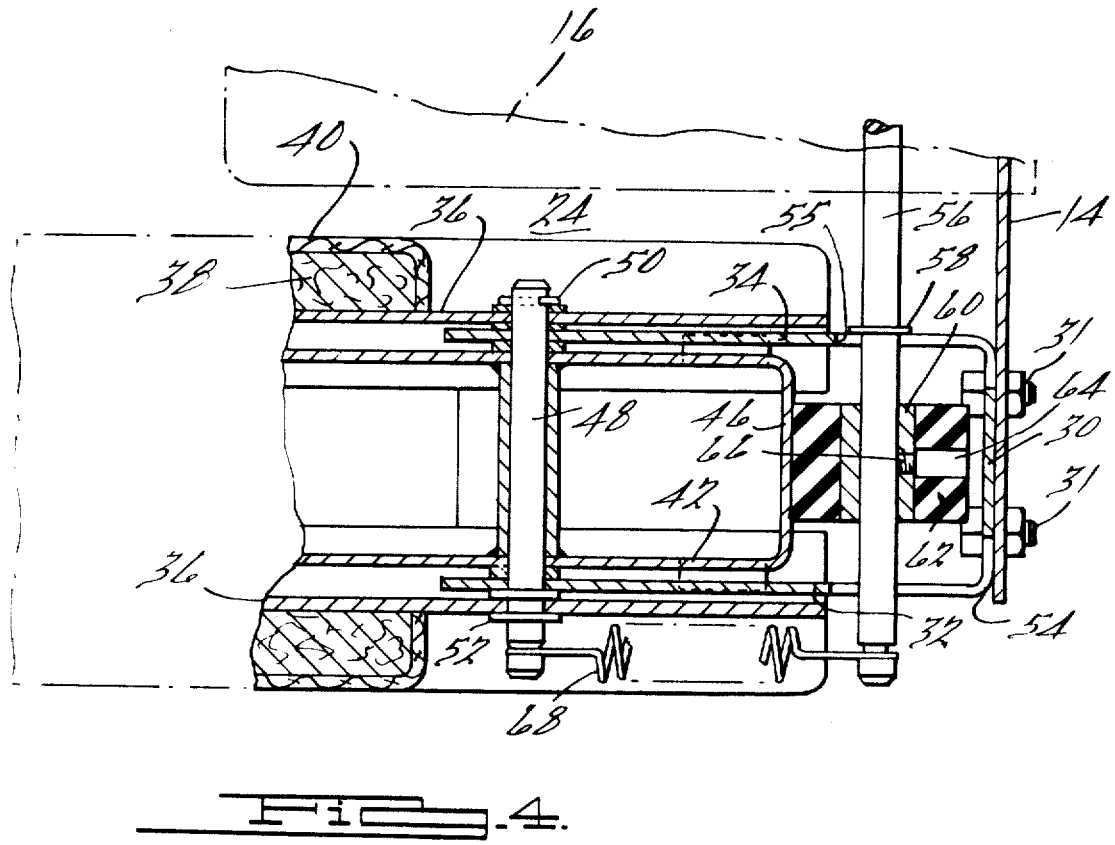
FIG. 4 is a sectional view taken along the line 4—4 of FIG. 1.

The mounting and construction of armrests 28 may be seen in detail in FIGS. 1, 3 and 4 of the drawings. A bracket 30 is secured to seat back frame 14 by a plurality of fasteners 31 and has a pair of forwardly extending inclined arms 32 and 34 projecting therefrom.

Armrest 28 is fabricated to include a double-walled structural frame. This frame includes an outer structural member 36 to which is secured a layer of padding 38 that is covered by a vinyl skin 40. within the area defined by outer structural member 36 is positioned a box-shaped inner structural member 42 having a top surface 44 and a rear end wall 46.

Armrest 28 is pivotally secured to arms 32 and 34 of bracket 30 by a pivot pin 48 that extends through both walls of structural members 36 and 42 as well as arms 32 and 34. Fasteners 50 and 52, that are secured to pivot pin 48 proximate the extremities thereof, prevent longitudinal movement of the pivot pin. A plurality of spacers (not numbered) are positioned between the various walls of the elements connected by pivot pin 48.

The pivotal connection between armrest 28 and bracket 30 provides that the armrest may be moved between a substantially horizontal position shown in FIG. 1, wherein armrest 28 is positioned for passenger utilization, and an upright position illustrated in FIG. 2 wherein armrest 28 is received and stowed within recess 24 of seat back cushion 16. When in the upright position, armrest 28 does not interfere with passenger access and egress from the vehicle passenger compartment. It is to be understood that the mounting and construction of armrest 26, that is located near the longitudinal axis of the vehicle, is identical to that of armrest 28 in that it too is pivotally movable between a substantially horizontal position and an upright position wherein it is located within recess 22 of seat back cushion 16.

Elongate slots 54 and 55 are formed through arms 32 and 34 of bracket 30 proximate the connection of bracket 30 with seat back frame member 14. A rotatable rod 56 extends through slots 54 and 55 and is secured against longitudinal movement by washer 58. A metal sleeve 60 surrounds rod 56 and is positioned between arms 32 and 34 of bracket 30. A sleeve 62 surrounds sleeve 60 and is constructed of material having a relatively high coefficient of friction, such as rubber. A hole 64 is formed in sleeve 62 to permit access to a setscrew 66 positioned in a tapped hole in sleeve 60. Screw 66 is tightened such that relative rotation between sleeve 60 and rod 56 is prevented. Sleeve 62 is mounted about sleeve 60 with an interference fit such that rod 56, sleeve 60 and sleeve 62 move in unitary rotation.

A tension spring 68 has one of its ends secured to pivot pin 48 and the other of its ends secured to rod 56. Since rod 56 extends through slots 54 and 55, the forces exerted by spring 68 tend to move rod 56 in a direction perpendicular to the longitudinal axis of this rod so that the outer peripheral surface of sleeve 62 is brought into intimate contact with the outer surface of end wall 46 of the inner structural member 42 of armrest 28. It readily may be appreciated that end wall 46 and sleeve 62 are in frictional contact with one another. The magnitude of the frictional force between end wall 46 and sleeve 62 easily may be controlled by selection of a spring 68 having a desired spring constant. The spring constant of spring 68 should be such that the frictional contact between end wall 46 and sleeve 62 is yieldable as will be described below.

When it is desired to move armrests 26 and 28 in unison, it is necessary only for the vehicle operator to grasp one of these armrests and exert a force causing a rotation of the grasped armrest about pivot pin 48. The frictional contact between end wall 46 and sleeve 62 provides that this rotation is transmitted via rod 56 to the other of the armrests that then will move in unison with the armrest manually motivated by the vehicle passenger. If movement of only one of the armrests is desired, the vehicle passenger manually moves this armrest as desired while holding the other armrest against movement. The spring constant of spring 68 is chosen such that the force of the spring urging end wall 46 and sleeve 62 into contact is such that the frictional forces between these two members easily may be overcome by a vehicle passenger holding one of the armrests against movement. A slippage thus will occur between the frictionally engaged surfaces such that one of the armrests may be moved while the other is not moved. It thus may be seen that end wall 46 of inner armrest structure 42 cooperates with sleeve 62 to form a friction brake that allows either unitary or individual movement of armrests 26 and 28.

This invention thus provides a vehicle seat assembly having a pair of pivotally movable armrests. One of these armrests is located outboard of a vehicle passenger seating position while the other is located inboard of this position. The movable armrests are interconnected by yieldable coupling means that allow the armrests to be moved either simultaneously or individually as desired by the vehicle passenger. Either of these armrests movements requires but a simple manual task by the vehicle passenger.

We claim:

1. A motor vehicle seat assembly having a substantially horizontal seat member and an upright seat back member secured to said seat member and having a pair of recesses formed therein, a pair of spaced apart armrests, said armrests being pivotally secured to said seat back member for swinging movement between substantially horizontal operative positions and upright retracted positions within said recesses, said armrests being located relative to said members such that movement of said armrests into said upright retracted positions is limited by contact with said seat back member and movement of said armrests away from said upright retracted positions is limited by contact with said seat member, and yieldable coupling means interconnecting said armrests such that said armrests are movable in unison when an external force is applied to either one of said armrests and are movable separately when one of two external forces of opposed directions is applied to each of said armrests.